(12) United States Patent
Geramifard et al.

(10) Patent No.: US 10,970,774 B1
(45) Date of Patent: Apr. 6, 2021

(54) SYSTEMS AND METHODS FOR LOCATING ITEMS

(71) Applicant: Amazon Technologies, Inc., Seattle, WA (US)

(72) Inventors: Alborz Geramifard, Cambridge, MA (US); Hugh Evan Secker-Walker, Newburyport, MA (US)

(73) Assignee: Amazon Technologies, Inc., Seattle, WA (US)

( * ) Notice: Subject to any disclaimer, the term of this patent is extended or adjusted under 35 U.S.C. 154(b) by 636 days.

(21) Appl. No.: 14/492,638

(22) Filed: Sep. 22, 2014

(51) Int. Cl.
*G06Q 30/00* (2012.01)
*G06Q 30/06* (2012.01)
*G06F 16/23* (2019.01)

(52) U.S. Cl.
CPC ......... *G06Q 30/0639* (2013.01); *G06F 16/23* (2019.01)

(58) Field of Classification Search
CPC .............................. G06Q 30/0639; G06F 16/23
See application file for complete search history.

(56) References Cited

U.S. PATENT DOCUMENTS

| | | | | |
|---|---|---|---|---|
| 6,587,835 B1* | 7/2003 | Treyz | ..................... | G06Q 20/12 705/14.64 |
| 6,795,537 B1* | 9/2004 | Gilbert | ................ | H04M 3/4938 379/201.02 |
| 7,263,500 B2* | 8/2007 | Deal | .................. | G06Q 30/0603 705/26.9 |
| 7,593,873 B1* | 9/2009 | Oakes, III | .............. | G06Q 20/32 705/26.1 |
| 8,116,291 B2* | 2/2012 | Annamalai | ........... | H04W 64/00 370/338 |
| 8,174,931 B2* | 5/2012 | Vartanian | ................ | G01S 15/08 367/99 |
| 8,571,578 B1* | 10/2013 | Chen | ..................... | G01S 5/0009 455/456.1 |
| 8,665,118 B1* | 3/2014 | Woodard | ............... | G08G 1/148 340/932.2 |
| 9,113,305 B2* | 8/2015 | Lim | ..................... | H04W 4/025 |
| 9,245,292 B2* | 1/2016 | Schweiger | ......... | G06Q 30/0641 |
| 9,310,466 B2* | 4/2016 | Jones | ................... | G06Q 10/087 |
| 9,503,873 B1* | 11/2016 | Yadav | ................ | G01C 21/3629 |

(Continued)

OTHER PUBLICATIONS

"RFID and Retail: The New Power Couple," by Bob Sanders, Customer, Jul./Aug. 2014, 32, 6, p. 26 (Year: 2014).*

(Continued)

*Primary Examiner* — Anne M Georgalas
(74) *Attorney, Agent, or Firm* — Eversheds Sutherland (US) LLP (57) ABSTRACT

Provided are systems and methods for receiving a plurality of item submissions from a plurality of mobile user devices (each item submission of the plurality of item submissions including: item identifier data indicative of an item; and item location data indicative of a location of the item), determining a determined location for the item (using the respective item location data for each of the plurality of item submissions), and storing the determined location for the item in an item location database. The determined location for the item is stored in association with an item identifier corresponding to the item, and the item location database stores determined locations for a plurality of items.

20 Claims, 4 Drawing Sheets

(56) References Cited

U.S. PATENT DOCUMENTS

| | | | | |
|---|---|---|---|---|
| 2005/0021561 | A1* | 1/2005 | Noonan | G06Q 30/06 |
| 2007/0124216 | A1* | 5/2007 | Lucas | G06Q 10/087 705/26.1 |
| 2010/0138037 | A1* | 6/2010 | Adelberg | G06Q 10/087 700/241 |
| 2012/0089409 | A1* | 4/2012 | Pawar | G06Q 10/083 705/1.1 |
| 2012/0278721 | A1* | 11/2012 | Beidel | G06Q 10/00 715/733 |
| 2013/0036043 | A1* | 2/2013 | Faith | G06Q 30/0643 705/39 |
| 2013/0080483 | A1* | 3/2013 | Richards | G06F 16/9537 707/803 |
| 2013/0191193 | A1* | 7/2013 | Calman | G06Q 30/00 705/14.4 |
| 2013/0282522 | A1* | 10/2013 | Hassan | G06Q 10/087 705/26.9 |
| 2014/0006229 | A1* | 1/2014 | Birch | G06Q 10/087 705/28 |
| 2014/0266615 | A1* | 9/2014 | Ouyang | G06Q 10/087 340/10.1 |
| 2014/0348384 | A1* | 11/2014 | Kolehmainen | G06Q 10/087 382/103 |
| 2015/0058129 | A1* | 2/2015 | Nevid | G06Q 30/0269 705/14.64 |

OTHER PUBLICATIONS

"Retail Solutions Partners with Gigwalk to Bring Real-Time Actionable Intelligence to In-Store Execution," PR Newswire [New York], Jun. 4, 2014, (Year: 2014).*

* cited by examiner

SYSTEMS AND METHODS FOR LOCATING ITEMS

BACKGROUND

In some instances, it is useful to know where certain items are located or are otherwise available. For example, in the context of retail products and retail stores, a person may want to know whether a store has a particular product and, if so, where the product is located within the store (e.g., on aisle three of ABC Supermarket). In the context of a home environment, for example, a person may want to know if a particular item, such as his or her wallet, is located in the home and, if so, where it is in the home (e.g., in the kitchen).

While this disclosure is susceptible to various modifications and alternative forms, specific embodiments thereof are shown by way of example in the drawings and will be described in detail herein. The drawings may not be to scale. It should be understood, however, that the drawings and detailed description thereto are not intended to limit the disclosure to the particular form disclosed, but to the contrary, the intention is to cover all modifications, equivalents, and alternatives falling within the spirit and scope of the present disclosure as defined by the appended claims.

DETAILED DESCRIPTION

Described herein are systems and methods for locating items. In some embodiments, a database of item locations is maintained and used to respond to requests for item location information. For example, if a person is grocery shopping in ABC Supermarket and searches for the location of XYZ cereal using an application on his or her mobile phone, the database may be used to determine that XYZ cereal is located on aisle three of ABC Supermarket, and the location (e.g., aisle three of ABC Supermarket) may be communicated to the person via the application.

In some embodiments, an item location database for an entity, such as a retail store, a home, or the like, is generated and/or maintained based at least in part on information provided by an entity and/or information provided by users that are not associated with the entity. For example, an item location database for a retail store may be generated and/or maintained based at least in part on information provided by the retail store (e.g., during product inventory conducted by employees) and/or information provided by individuals who are not associated with the store (e.g., shoppers). In some embodiments, the information provided by users includes information obtained via crowdsourcing. Crowdsourcing may refer to the process of obtaining needed services, ideas, or content by soliciting contributions from a large group of people (e.g., an online community), rather than from traditional employees or suppliers. In the context of gathering information for generating and/or maintaining an item location database (e.g., for a retail store), the information may come from an undefined public (e.g., shoppers) rather than from sources that are commissioned from a specific, named group (e.g., employees commissioned to take inventory of the store's products).

In some embodiments, the information used to generate and/or maintain an item location database is obtained via mobile user devices. For example, a user shopping in ABC Supermarket may use his or her mobile phone to submit item information (e.g., an item submission) for XYZ cereal (e.g., indicating that XYZ cereal is located on aisle three of ABC Supermarket). The item submission may be transmitted to a location provider for use in determining the location of XYZ cereal. This type of submission process can be repeated by any number of users, for any number of different items, and/or in any number of different locations. For example, the same user can submit information for soft drinks on aisle six of ABC Supermarket, a second user can submit information for XYZ cereal on aisle three of ABC Supermarket, a third user can submit information for a television at Mike's Electronics Store, and/or the like.

In some embodiments, an item submission includes item identification data, item location data, and/or user data. In some embodiments, item identification data includes data that can be used to identify an item, such as an item's type, name, brand, model, and/or the like. For example, item identification data may include an item name, a Universal Product Code (UPC) number, an item model number, and/or the like. In some embodiments, item location data includes data that can be used to determine a geographical location of an item, such as the location of an item within a business. For example, item location data may include geographic coordinates (e.g., latitude and longitude) indicative of where an item is located, a store name, a department, a floor/level, an aisle number, and/or the like. In some embodiments, user data includes information that can be used to identify a user and/or a user device from which an item submission is acquired.

In some embodiments, one or more portions of an item submission are generated manually. For example, a user may manually enter identification data and/or item location data. If, for example, a user is shopping in ABC Supermarket and the user notices a box of XYZ cereal on aisle three, the user may enter (e.g., manually type in a field) item identification data including the product name "XYZ cereal," and/or item location data, including store name "ABC Supermarket" and "aisle three" via an item submission application on the user's mobile phone. In some embodiments, one or more portions of the item submission are automated. For example, in the above described embodiment, the user may enter the item identification data including the product name "XYZ cereal," but the application may automatically retrieve the item location data including geographic coordinates where the user is located at the time of the submission (e.g., from a positional device of the phone, such as an integrated Global Positioning System (GPS) device of the phone). In some embodiments, location information may be derived from and/or supplemented by a motion sensing device. For example, if a GPS signal is lost as a user enters a building, a motion sensing device of the mobile device may be used to update the location of the device as the user moves through the building. In some embodiments, such location information can be derived from location information obtained from any variety of suitable locating techniques including, for example, Wi-Fi-based positioning system (WPS) or WiPS/WFPS.

In some embodiments, an item submission is generated using a camera device, such as a camera on a mobile phone, smart eyewear or other personal image acquisition device. For example, a user shopping in ABC Supermarket may acquire a photographic image of XYZ cereal using a camera on his or her mobile phone while shopping on aisle three, and submit a corresponding item submission to a location provider for use in determining the location of XYZ cereal. Such an image may be a geotagged image (e.g., an image including geotag data indicative of the geographic location at which the image was taken—on aisle three of ABC Supermarket), and the item submission may simply include the geotagged image. In some embodiments, an item submission is generated using a scanner device, such as a scanner on a mobile phone, smart eyewear, or other personal image acquisition device. For example, a user shopping in ABC Supermarket may use a camera on his or her mobile phone to scan a barcode (e.g., a Universal Product Code (UPC)) on a box of XYZ cereal, and submit a corresponding item submission including the barcode and the location of the mobile device at the time the barcode was scanned (e.g., geolocation data acquired by the phone at or near the time the barcode was scanned) to a location provider for use in determining the location of XYZ cereal.

In some embodiments, item submissions may be automatically submitted with little to no user interaction. For example, if a user has a mobile device with a camera, such as smart eyewear, images may be continually/regularly acquired, and item submissions including the images may be continually provided to a location provider for use in determining the locations of items that are captured in the images. If, for example, a user is wearing a pair of smart glasses including a camera device while walking through the aisle of ABC Supermarket, the smart glasses may continually acquire images of the user's field of view as the user walks through the aisle of ABC Supermarket. The smart glasses may geotag the images and continually submit item submissions including some or all of the geotagged images. A location provider can use these images to identify any variety of products in the field of view and associate them with the locations of the respective images that include the products. In some embodiments, submissions are based on near field identification, such as that facilitated by radio-frequency identification (RFID) tags. If, for example, a user device includes an RFID reader, and an item (such as a person's wallet) includes an RFID tag disposed thereon and the user device is positioned near the item, the RFID tag identifier corresponding to the item may be sensed via the RFID reader, a location of the user device at or near the time of sensing the RFID tag may be determined, and a submission may be generated that includes an identifier associated with the RFID and the location corresponding to the sensing of the RFID tag. In some embodiments, the RFID tag identifiers of items proximate a user and the corresponding locations are automatically acquired and submitted via the user's mobile user device as the user moves through/about a physical entity.

In some embodiments, a location provider extracts relevant item identification and location information from a user submission, and uses this information to generate and/or maintain the item location database. For example, in the case of an image of XYZ cereal submitted by a first user, the location provider can use the image and its associated data (e.g., the geocoding data) to determine the item associated with the image (e.g., XYZ cereal) and the location of the item (e.g., aisle three of ABC Supermarket). For example, the location provider may conduct image processing on the first image to identify the item as being "XYZ cereal" and use the geographic coordinates provided in the geocoding data provided with the first image to determine the location of "aisle three of ABC Supermarket." In some embodiments, a new entry can be created for the item or an existing entry for the item is updated to reflect the information acquired via the item submission. If, for example, the item location database does not include an entry for "XYZ cereal," the location provider may add an entry to the database for the item, including an item identifier of "XYZ cereal" and item location information corresponding to "aisle three of ABC Supermarket." If the item location database already includes an entry for "XYZ cereal" (e.g., an entry having an item identifier of "XYZ cereal"), the location provider may update the entry to reflect the item location information corresponding to "aisle three of ABC Supermarket."

In some embodiments, more than one location may be associated with an item. For example, XYZ cereal may be located on both of aisles one and three of ABC Supermarket, item submissions may be received that correspond to both of aisles one and three of ABC Supermarket, and the location information for the XYZ cereal entry of the item location database may include both of "aisle one of ABC Supermarket" and "aisle three of ABC Supermarket." Thus, for example, a user inquiring about the location of XYZ cereal may be provided with information about both locations.

In some embodiments, an item location is updated based at least in part on the location information. In some embodiments, an item location is updated to reflect the most recent location information. For example, an existing item location may be replaced with a location corresponding to the most recent item submission. If, for example, a first item submission indicates that XYZ cereal is located on aisle one of ABC Supermarket, and a second/subsequently received item submission indicates that XYZ cereal is located on aisle three of ABC Supermarket, the location information for the XYZ cereal entry of the item location database may be updated to be "aisle one of ABC Supermarket" after receipt of the first item submission, and subsequently updated to be "aisle three of ABC Supermarket" after receipt of the second item submission. That is, an existing item location is replaced with a location corresponding to the most recent item submission.

In some embodiments, an item location is changed to include a location corresponding to the most recent item submission. If, for example, a first item submission indicates that XYZ cereal is located on aisle one of ABC Supermarket, and a second/subsequently received item submission indicates that XYZ cereal is located on aisle three of ABC Supermarket, the location information for the XYZ cereal entry of the item location database may be updated to be "aisle one of ABC Supermarket" after receipt of the first item submission, and subsequently updated to also include both of "aisle one of ABC Supermarket" and "aisle three of ABC Supermarket" after receipt of the second item submission.

In some embodiments, an item location is updated based on receipt of at least a threshold number of similar item locations. For example, an item location may be changed when a threshold number of item submissions indicating a different location are received. If, for example, a first set of submissions indicates that XYZ cereal is located on aisle one of ABC Supermarket, a threshold of at least five similar submissions is required to change a location for an item, and a single submission is received indicating that XYZ cereal is located on aisle three of ABC Supermarket, the location information for the XYZ cereal entry of the item location database may be initially updated to include "aisle one of ABC Supermarket" based on the first set of item submissions, but may not be subsequently changed to "aisle three of ABC Supermarket," because the threshold number of submissions has not yet been received. The location information indicating that XYZ cereal is located on aisle three of ABC Supermarket may be retained stored or otherwise retained for later use. If an additional four submissions are received indicating that XYZ cereal is located on aisle three of ABC Supermarket, however, the location information for the XYZ cereal entry of the item location database may be updated to be or include "aisle three of ABC Supermarket," because the threshold number of similar submissions (e.g., five similar submissions) has been received.

In some embodiments, an item location may include multiple locations ranked and/or prioritized based on a number of corresponding submissions received. If, for example, a first set of ten submissions indicates that XYZ cereal is located on aisle one of ABC Supermarket, a second set of five submissions indicates that XYZ cereal is located on aisle three of ABC Supermarket, a third set of two submissions indicates that XYZ cereal is located on aisle ten of ABC Supermarket, and a threshold of at least five similar submissions is required to change a location for an item, the location information for the XYZ cereal entry of the item location database may be updated to include a primary location of "aisle one of ABC Supermarket" based on the first set of item submissions having the highest number of submissions, and a secondary location of "aisle three of ABC Supermarket" based on the second set of item submissions having the second highest number of submissions. The location of aisle ten of ABC Supermarket may not yet be included based on the threshold number of submissions having not been met yet. Thus, in response to a query for a location of the item (e.g., XYZ cereal), a user may be informed that the item is most likely located in one location (e.g., aisle one of ABC Supermarket), but may also be found at another location (e.g., at aisle three of ABC Supermarket).

In some embodiments, an item location may be updated based on how recently corresponding item submissions have been received. For example, an item location may be based on item submissions submitted within a moving window of time. If, for example, ten item submissions for XYZ cereal were submitted more than one week ago, five item submissions for XYZ cereal were submitted within the last week, and a relevant window for item submissions is one week (e.g., the last seven days), the current item location for XYZ cereal may be determined using the five item submissions for XYZ cereal submitted within the last week, but not using ten item submissions for XYZ cereal that were submitted more than one week ago.

In some embodiments, an item location may be removed if corresponding item submissions have not been received for a threshold period of time. If, for example, a set of ten submissions indicates that XYZ cereal is located on aisle one of ABC Supermarket, no submissions for XYZ cereal have been received in the last week, and a threshold period of time for receiving item submissions is one week (seven days), the entry for XYZ cereal may be updated to reflect no known location. Such an embodiment may help to ensure that location information is fresh and has not become outdated.

In some embodiments, an item location is weighted based on the temporal proximity of the item submissions. If, for example, a first submission for XYZ cereal was submitted four days ago, a second submission for XYZ cereal was submitted two days ago, and a third submission for XYZ cereal was submitted one day ago, the current item location for XYZ cereal may be determined using the three submissions, including weighting the first (oldest) submission the least, weighting the second submission moderately, and weighting the third (newest) submission the most in determining the location. If, for example, the first, second and third submissions indicated that XYZ cereal was located on aisles one, one, and three of ABC Supermarket, respectively, and have weightings/scores inversely proportional to their age in days (e.g., scores of 0.25, 0.5 and 1, respectively), aisle three of ABC Supermarket may be determined to have total score of 1 and aisle one of ABC Supermarket may be determined to have a total score of 0.75 (e.g., 0.25+ 0.5=0.75), and the item location for XYZ cereal may be determined to be aisle three of ABC Supermarket based on the location of aisle one having the highest score.

In some embodiments, an item location database can be used to provide information regarding the location of items. For example, if a user is grocery shopping in ABC Supermarket and searches for the location of XYZ cereal using an application on his or her mobile phone, a location provider may receive the search query, and the location provider may query the item location database for a location of XYZ cereal. If an entry for XYZ cereal exists in the item location database, and it includes an item location of "aisle three of ABC Supermarket," the location provider may determine that XYZ cereal is located on aisle three of ABC Supermarket, and communicate the location of "aisle three of ABC Supermarket" to the user. If an entry for XYZ cereal does not exist in the item location database, a corresponding message may be provided as well, such as "The location of XYZ cereal is unknown at this time."

In some embodiments, providing location information includes providing an indication of one or more locations where an item is located. For example, if a user submits a query for (e.g., searches for) the location of XYZ cereal using an application on his or her mobile phone, and the item location database indicates that the item is located in multiple discrete locations, such as aisle one and aisle three of ABC Supermarket and aisle ten of DEF Supermarket, all of the locations may be communicated to the user. In some embodiments, an item location request may include a request for location information about a single item or multiple items. For example, a user can submit a list (e.g., a shopping list or a wish list) identifying one or more items of interest. If, for example, a user is only interested in locating XYZ cereal, the user may submit a list including only XYZ cereal, and the corresponding item location request may include a request for information about XYZ cereal. If, for example, a user is interested in locating several items, such as XYZ cereal, AAA ice cream, and so forth, the user may submit a list including XYZ cereal, AAA ice cream, and so forth (e.g., a shopping list for multiple items), and the corresponding item location request may include a request for information about XYZ cereal, AAA ice cream, and so forth.

In some embodiments, providing location information includes providing navigational information to direct a user to the location. For example, if a user submits a query for (e.g., searches for) the location of XYZ cereal using an application on his or her mobile phone, and the item location database indicates that the item is located on aisle three of ABC Supermarket, the user may be presented with an interactive navigational display on the screen of the phone, e.g., including a map, arrows, textual directions, and/or other queues to direct the user to aisle three of ABC Supermarket. The interactive map and/or navigation instructions may include, for example, text stating that "XYZ cereal is located at aisle three of ABC Supermarket," a geographic map having one or more markers indicative of the geographic location of ABC Supermarket, arrows (or other on-screen navigational queues) that dynamically change to guide the user to aisle three of ABC Supermarket, voice prompts (or other audible queues) that interactively guide the user to aisle three of ABC Supermarket, written turn-by-turn directions that guide the user to aisle three of ABC Supermarket, and so forth. In some embodiments, the content may include location information that provides an efficient sequence and routing for navigating to a plurality of items. If three items are determined to be located at ABC Supermarket, one item is determined to be located at DEF Grocery, and two items are determined to be located at Mike's Electronics Store, for example, the content may include an interactive map and/or navigation instructions to direct the user to first visit ABC Supermarket (to purchase the three items located there), then to visit Mike's Electronics Store (to purchase the two items located there), and finally to visit DEF Grocery (to purchase the item located there). In some embodiments, the content may include location information that provides directions for navigating to an item within a physical entity location. For example, if XYZ cereal is determined to be located on aisle three of ABC Supermarket and AAA ice cream is determined to be located on aisle one of ABC Supermarket, the content may include an interactive map and/or navigation instructions to direct the user to first visit aisle one of ABC Supermarket to find AAA ice cream and then to visit aisle three of ABC Supermarket to find XYZ cereal.

In some embodiments, a user is prompted to provide an item submission that confirms whether the item is actually located at the indicated location. For example, if a user is directed to aisle three of ABC Supermarket to find XYZ cereal, upon determining that the user has arrived at the target location (e.g., aisle three of ABC Supermarket), the application on the mobile phone may present the inquiry "Is XYZ cereal located at aisle three of ABC Supermarket?" and prompt the user to select "yes" if the item is located there, or select "no" if the item is not located there. Thus, users may be encouraged to continue the cycle of crowdsourcing information.

In some embodiments, an administrator can modify entries of the item database. For example, a database administrator and/or an employee of an entity can submit an administrator item submission that specifies a location of an item, and the location information of an entry in the item database may be updated to reflect the location. If, for example, an employee taking inventory at ABC Supermarket notices that XYZ cereal has been moved from aisle one to aisle three, the employee may submit an administrator item submission that specifies that XYZ cereal is located at aisle three of ABC Supermarket, and the location information of the entry for XYZ cereal in the item database may be updated to include aisle three of ABC Supermarket. Such an embodiment may be useful where an entity knows the location of an item and can provide accurate item location information that can also be supplemented by crowd-sourced item location information.

Figure 1:
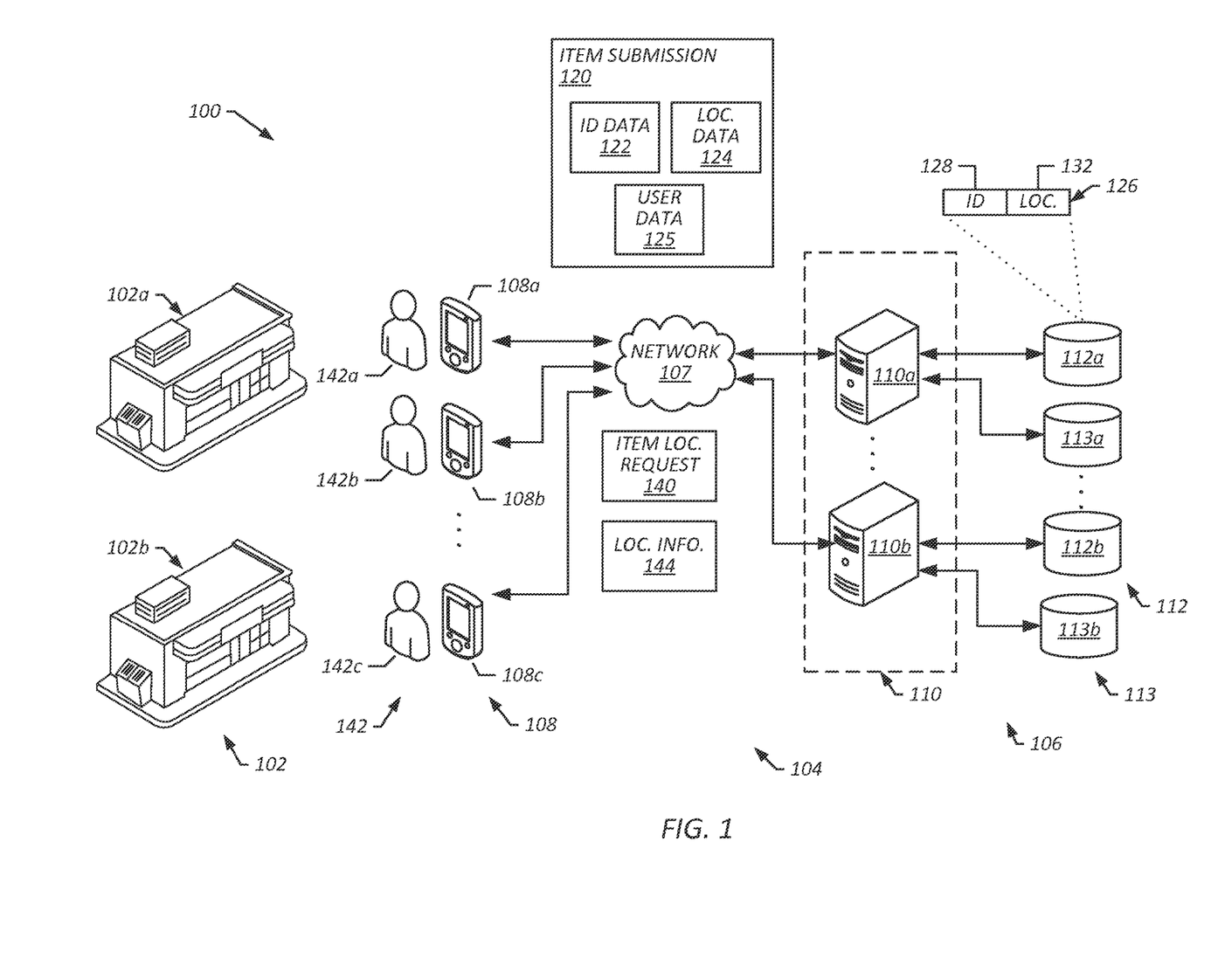
FIG. 1 is a diagram that illustrates an item locating environment in accordance with one or more embodiments.

FIG. 1 is a diagram that illustrates an item locating environment ("environment") 100 in accordance with one or more embodiments. Environment 100 includes physical entity locations ("entity locations") 102 (e.g., entity locations 102a and 102b) and an item location system 104. Item location system 104 may include an item location provider ("provider") 106, one or more user devices ("user devices") 108 (e.g., user devices 108a-108c) communicatively coupled via a network 107. Item location provider 106 may include one or more item location servers ("location servers" or "servers") 110 (e.g., servers 110a and 110b), one or more item location databases ("location databases" or "databases") 112 (e.g., databases 112a and 112b), and one or more item submission databases ("submission databases") 113 (e.g., databases 113a and 113b).

Environment 100 may provide for the transmission of item submissions 120 (e.g., including item identification data 122, item location data 124 and/or user data 125) from the user devices 108 to the location servers 110. Location servers 110 may use the item submissions 120 to determine the locations of items (e.g., within brick and mortar entity locations 102) and update database entries 126 (e.g., including an item identifier 128 and/or item location 132) of the location databases 112 accordingly. For example, while shopping on aisle three of ABC Supermarket 102a, the user 142a may use an item location application on his or her user device 108a to take a picture of a box of XYZ cereal, and the application may generate and transmit a corresponding item submission 120, including the geotagged image of the XYZ cereal, to the location server 110a. The location server 110a may process the identification data 122 (e.g., process the image via a suitable image processing technique, such as pattern matching) to determine an item identifier for the item (e.g., "XYZ cereal") and process the item location data 124 (e.g., the geotag data of the geotagged image) to determine an item location (e.g., "aisle three of ABC Supermarket") associated with the item submission 120. The location server 110a may update the database entry 126 corresponding to XYZ cereal based on the determined location. For example, the location server 110a may change the item location 132 of an entry having an item identifier 128 of "XYZ cereal" to correspond to "aisle three of ABC Supermarket". In some embodiments, the item submissions 120 are stored in respective entries in item submission database 113 (e.g., including or otherwise stored in association with an item identifier corresponding to the item). Servers 110 may access and use the item submission entries (and the location data 124 contained therein) to determine one or more item locations 132 for an item as discussed herein.

In response to receiving an item location request ("item location query") 140 (e.g., a query for item location information submitted by a user 142 via a user device 108) for an item, location servers 110 may determine and/or retrieve one or more locations for the item (e.g., using the item location 132 of a corresponding database entry 126), and may provide corresponding item location information 144 to user devices 108 for presentation (e.g., display) to the user 142. For example, while at home, the user 142c may use an item location application running on his or her user device 108c to request information about the location of XYZ cereal, and the application may generate and transmit a corresponding item location request 140 to the location server 110a. The location server 110a may process the item location request 140, including identifying the database entry 126 corresponding to XYZ cereal (e.g., the database entry 126 having an identifier "XYZ cereal" that matches the item of the request) and retrieve one or more item locations 132 for XYZ cereal (e.g., "aisle three of ABC Supermarket"). The location server 110a then may provide corresponding item location information 144 (e.g., an interactive map and/or navigation instructions to direct user 142c to aisle three of ABC Supermarket 102a) to the user device 108c for display to the user 142c.

In some embodiments, a physical entity location 102 includes one or more physical locations, such as a business's brick and mortar location or a person's home. For example, a physical entity location 102 may include a building, such as a brick and mortar retail location (e.g., a supermarket selling physical items such as groceries, an electronics store selling physical items such as televisions, and/or the like); an office located in a building; a library building including physical items such as books, magazines, newspapers, and/ or the like; a business's booth at a tradeshow, fair, or festival; or a person's home (e.g., a house, an apartment, a condominium, and/or the like including physical items that are portable and moveable throughout the home such as keys, wallets, mobile phones, mobile computers, television remotes, and/or the like). A physical entity may not include a virtual location, such as an Internet website or other network location/content site.

The network 107 may include an element or system that facilitates communication between entities of the environment 100 (e.g., including the location servers 110 and the user devices 108). For example, the network 107 may include an electronic communications network, such as the Internet, a local area network ("LAN"), a wide area network ("WAN"), a wireless local area network ("WLAN"), a cellular communications network, and/or the like. In some embodiments, the network 107 includes a single network or a combination of networks.

The user devices 108 may include any variety of electronic devices, such as a computer device. In some embodiments, a user device 108 includes a device capable of communicating information via the network 107. A user device 108 may include one or more mobile user devices, such as a laptop computer, a tablet computer, a personal digital assistant (PDA), a smart phone, smart eyewear, and/or the like. In some embodiments, a user device 108 may be a client of the location servers 110. In some embodiments, a user device 108 may include various input/ output (I/O) interfaces, such as a graphical user interface (e.g., a display screen), an audible output user interface (e.g., a speaker), an audible input user interface (e.g., a microphone), an image acquisition interface (e.g., a camera or a barcode scanner), a near field detection device (e.g., a radio-frequency identification (RFID) reader), a security interface (e.g., an eye or fingerprint scanner), a keyboard, a pointer/selection device (e.g., a mouse, a trackball, a touchpad, a touchscreen, a stylus or the like), a printer, or the like. In some embodiments, a user device 108 may include general computing components and/or embedded systems optimized with specific components for performing specific tasks. In some embodiments, a user device 108 includes one or more computer systems similar to that of computer system 1000 described below with regard to at least FIG. 4.

In some embodiments, a user device 108 includes programs/applications that can be used to generate a request for content, to provide content, to render content, and/or to send/receive requests to/from other devices via the network 107, such as client applications used for communicating with the location servers 110. For example, a user device 108 may include an Internet browser application that facilitates communication with the network 107 and/or other entities of the environment 100. In some embodiments, a program/ application of a user device 108 includes modules having program instructions that are executable by a computer system to perform some or all of the functionality described herein with regard to the user device 108.

Item location servers 110 may include any computing devices having network connectivity and capable of providing one or more services to network clients, such as the user devices 108. These services may include storage of data and/or processing of data. For example, a location server 110 may serve client requests received from the user devices 108 by processing the requests, storing corresponding data in databases (e.g., databases 112), and/or providing corresponding results/content to clients (e.g., the user devices 108). Although certain embodiments are described with regard to a single server for the purpose of illustration, embodiments may include employing multiple servers, such as a plurality of distributed servers. In some embodiments, a location server 110 includes one or more computer systems similar to that of computer system 1000 described below with regard to at least FIG. 4.

Databases 112 and 113 may include a medium for the storage of data thereon. A database may include a non-transitory computer-readable medium storing data thereon that is accessible by various entities of the environment 100, such as a database management system (DBMS) of the location servers 110. In the illustrated embodiment, a database 112 may store one or more item location database entries 126 having information about a particular item or group of items. In some embodiments, the item submissions 120 are stored in respective entries in item submission database 113 (e.g., including or otherwise stored in association with an item identifier corresponding to the item). Servers 110 may access and use the item submission entries (and the location data 124 contained therein) to determine one or more item locations 132 for an item as discussed herein. Although certain embodiments are described with regard to a single database for the purpose of illustration, embodiments may include employing multiple databases, such as a plurality of distributed databases. In some embodiments, a database is associated with one or more entities. For example, database 112a may be an item location database for multiple entities, such as ABC Supermarket 102a, Mike's Electronics Store 102b, and/or the like. In some embodiments, a database may be reserved exclusively for a given entity. For example, database 112a may be a database exclusively for ABC Supermarket 102a (e.g., including only database entries 126 for items/products sold in ABC Supermarket), and database 112b may be an item location database exclusively for Mike's Electronics Store 102b (e.g., including only database entries 126 for items/products sold in Mike's Electronics Store).

Figure 2A:
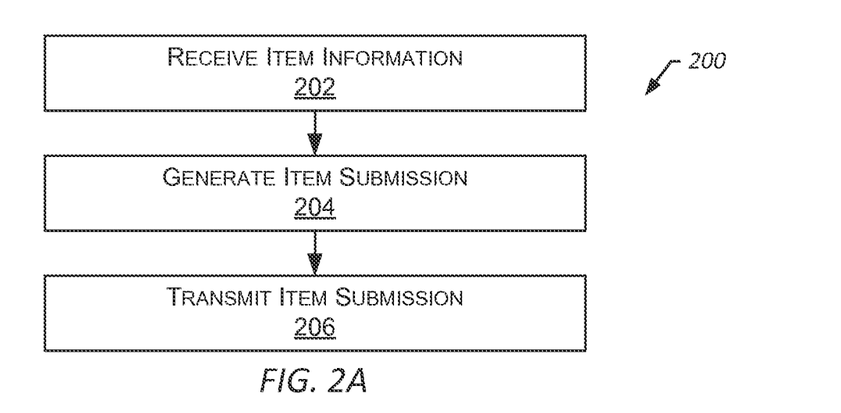
FIG. 2A is a flowchart that illustrates a method of providing an item submission in accordance with one or more embodiments.
Figure 2B:
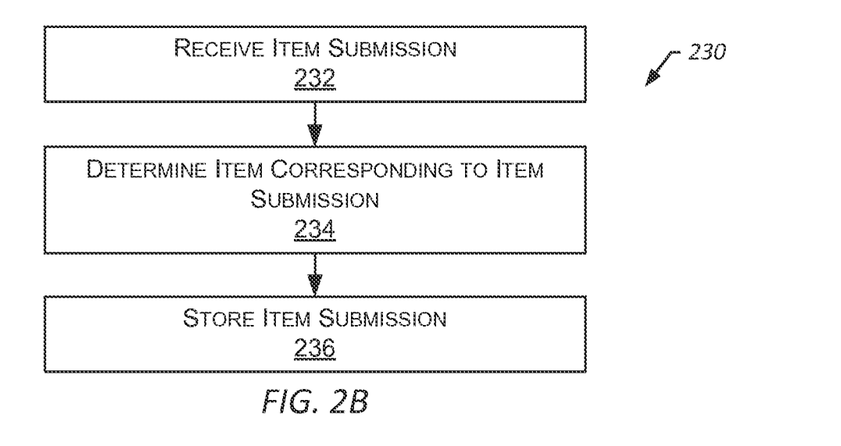
FIG. 2B is a flowchart that illustrates a method of updating an item submission database in accordance with one or more embodiments.
Figure 2C:
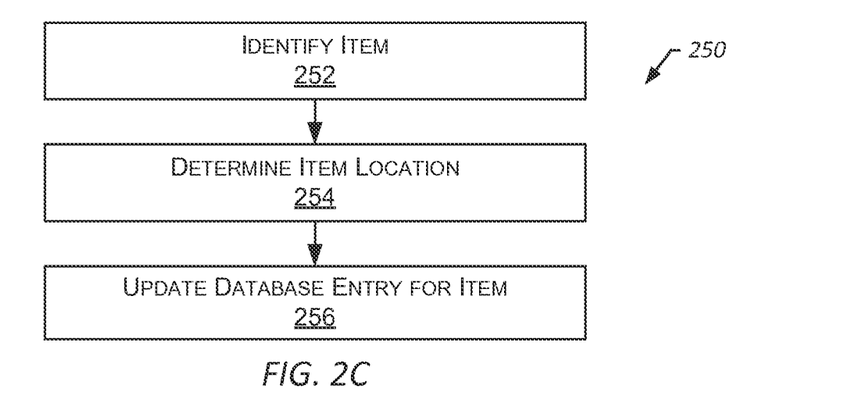
FIG. 2C is a flowchart that illustrates a method of updating an item location database in accordance with one or more embodiments.

FIGS. 2A, 2B and 2C are flowcharts that illustrate methods for maintaining an item location database in accordance with one or more embodiments. FIG. 2A is a flowchart that illustrates a method 200 of providing an item submission in accordance with one or more embodiments. FIG. 2B is a flowchart that illustrates a method 230 of updating an item submission database in accordance with one or more embodiments. FIG. 2C is a flowchart that illustrates a method 250 of updating an item location database in accordance with one or more embodiments.

Method 200 may generally include receiving item information (block 202), generating an item submission (block 204), and transmitting an item submission (block 206). Method 200 may be performed, for example, by an item location application of a user device 108. Method 230 may generally include receiving an item submission (block 232), determining an item corresponding to the item submission (block 234), and storing the item submission (block 236). Method 250 may include, identifying an item (block 252), determining one or more location for the item (e.g., using the location data 124 of item submissions 120 corresponding to the item) (block 252), and updating a database entry for the item (block 256). Method 230 and/or method 250 may be performed, for example, by one or more location servers 110.

In some embodiments, method 230 is performed in response to receiving an item submission 120. For example, server 110a may store the item submissions 120 as respective entries in the item submission database 113a. Each entry may be associated with the item corresponding to the entry. The servers 110a may access and use the item submission entries (and the location data 124 contained therein) to determine one or more item locations 132 for item as discussed herein. In some embodiments, method 250 is performed periodically and/or in response to an event. For example, server 110a may perform method 250 (e.g., updating of the item location database 112a) on a regular basis (e.g., hourly, daily, and/or the like) and/or in response to an event or trigger (e.g., in response to receipt of an item submission 120 and/or a request for a location of an item).

In some embodiments, receiving item information (block 202) includes receiving item identification data 122, item location data 124 and/or user data 125 acquired via a user device 108. Receiving item information may include, for example, receiving by an item location application of a user device 108, item identification data 122. If, for example, the user device 108a includes a device having a camera, receiving item identification data may include receiving an image of an item, such as a photographic image of a box of XYZ cereal acquired via the camera of the user device 108a. If, for example, the user device 108a includes a device having a barcode scanner, receiving item identification data may include receiving an image of an item, such as a UPC code from a box of XYZ cereal, acquired via the barcode scanner of the user device 108a. If, for example, the user device 108a includes a user input interface, such as a keyboard or a microphone (and has voice recognition capabilities), receiving item identification data may include receiving a description of an item, such as the typed string "XYZ cereal" or the spoken phrase "XYZ cereal," acquired via the keyboard or microphone (and the voice recognition service) of the user device 108a. If, for example, the user device 108a includes an RFID reader, and an item (such as a person's wallet) includes an RFID tag disposed thereon and the user device 108a is positioned near the item, receiving item identification data may include receiving an RFID tag identifier corresponding to the item and sensed via the RFID reader.

In some embodiments, receiving item information (block 202) includes receiving item location data 124 acquired via one or more locating devices of a user device 108. If, for example, the user device 108a includes a device having a camera and a positioning device (e.g., an integrated GPS receiver capable of determining a geographic location of the user device 108), receiving item identification data may include receiving geotag data that accompanies an image of an item, such as a photographic image of a box of XYZ cereal acquired via the camera of the user device 108a. The geotag data may include, for example, geographic coordinates or similar location data that indicates a geographic location (e.g., a latitude and a longitude) at which the image was acquired. For example, the geotag data for a photographic image of a box of XYZ cereal taken by the user device 108a while shopping on aisle three of ABC Supermarket 102a may include geographic coordinates that correspond to aisle three of ABC Supermarket 102a. If, for example, the user device 108a includes a user input interface, such as a keyboard or a microphone (and has voice recognition capabilities), receiving item location data may include receiving a user provided location, such as the typed string "aisle three of ABC Supermarket" or the spoken phrase "aisle three of ABC supermarket," acquired via the keyboard or microphone (and the voice recognition service) of the user device 108a. If, for example, the user device 108a includes an RFID reader, and the item includes an RFID tag and the user device 108a is positioned near the item to sense the RFID tag, receiving item location data 124 may include receiving location data that indicates a geographic location of the user device 108a at or near the time when the RFID tag was sensed by the RFID reader.

In some embodiments, receiving item information (block 202) includes receiving user data 125. User data 125 may include information that identifies the user 142 and/or the user device 108 from which an item submission 120 is acquired. For example, if user device 108a includes a mobile smart phone, user data 125 may include a unique identification number (e.g., serial number) associated with user device 108a that can use used to identify item submissions 120 that are submitted via user device 108a. The user data 125 may be anonymized to protect the identity and privacy of the users 142. In some embodiments, user data 125 can be used to verify the usefulness of the data associated with the item submission 120. For example, if a user 142c has a reputation of submitting inaccurate location data 124, item submissions 120 associated with the user 142c (e.g., having user data 125 associated with the user 142c or the user's device 108c) may be ignored or given a reduced weighting in the process of identifying an item's location 132.

In some embodiments, generating an item submission (block 204) includes generating an item submission 120 including item identification data 122, item location data 124 and/or user data 125. Continuing with the above described embodiment relating to the item "XYZ cereal" and the location "aisle three of ABC Supermarket," for example, generating an item submission may include generating an item submission 120 including item identification data 122 corresponding to or otherwise indicative of XYZ cereal and/or item location data 124 corresponding to or otherwise indicative of aisle three of ABC Supermarket. In some embodiments, an item submission includes a geotagged image. If, for example, an image of the XYZ cereal is acquired, generating an item submission may include appending to the image the geotag data for aisle three of ABC Supermarket, or otherwise obtaining the geotagged image.

In some embodiments, transmitting an item submission (block 206) includes transmitting an item submission 120 to a location provider 106. Continuing with the above described embodiment relating to the item "XYZ cereal" and the location "aisle three of ABC Supermarket," for example, transmitting an item submission may include the item location application executing on the user device 108a causing the user device 108a to transmit the item submission 120 (e.g., including the geotagged image of the XYZ cereal box acquired by the user 142a while shopping on aisle three of ABC Supermarket 102a) to the item location server 110a via the network 107.

Referring to method 230 of FIG. 2B, in some embodiments, receiving an item submission (block 232) includes a location provider 106 receiving an item submission 120. Continuing with the above described embodiment relating to the item "XYZ cereal" and the location "aisle three of ABC Supermarket," for example, receiving an item submission may include the item location server 110*a* receiving the item submission 120 (e.g., including the geotagged image of the XYZ cereal box acquired by the user 142*a* while shopping on aisle three of ABC Supermarket 102*a*) from the user device 108*a* via the network 107.

In some embodiments, determining an item corresponding to the item submission (block 234) includes identifying an item (e.g., name, brand and/or type) based on the item identification data 122 of an item submission 120. Continuing with the above described embodiment relating to the item "XYZ cereal" and the location "aisle three of ABC Supermarket," for example, determining an item corresponding to the item submission may include the location server 110*a* processing the item identification data 122 of the item submission 120 received from the user device 108*a* to determine the product of "XYZ cereal." If, for example, the item identification data 122 includes the image of the XYZ cereal box, processing the item identification data 122 may include the location server 110*a* conducting any suitable image processing, such as pattern matching, text recognition, and/or the like, to identify the item as XYZ cereal. If, for example, the item identification data 122 includes a UPC code from the box of XYZ cereal, processing the item identification data 122 may include the location server 110*a* identifying the code and conducting a product look-up using the code, to identify the item as XYZ cereal. If, for example, the item identification data 122 includes a description of an item, such as the typed string "XYZ cereal" or the spoken phrase "XYZ cereal," processing the item identification data 122 may include the location server 110*a* conducting processing on the strings/phrases, such as normalizing the strings/phrases, to identify the item as XYZ cereal. If, for example, the item identification data 122 includes an RFID tag associated with Mike's wallet, processing the item identification data 122 may include the location server 110*a* conducting an item look-up using the RFID tag, to identify the item as "Mike's Wallet."

In some embodiments, storing the item submission (block 236) includes storing the received item submission 120 in an item submission database 113 in association with an identification of the determined item. For example, continuing with the above described embodiment relating to the item "XYZ cereal" and the location "aisle three of ABC Supermarket" and the determined product of "XYZ cereal", for example, storing the item submission may include server 110*a* generating an entry in the submission database 113*a* including (a) an item identifier corresponding to "XYZ Cereal" and (b) the corresponding submission data (e.g., item identification data 122, item location data 124 and/or user data 125 of the item submission 120). Accordingly, a submission database 113 may include any number of entries corresponding to various items, and associated item submissions.

Referring to method 250 of FIG. 2C, in some embodiment, identifying an item (block 252) includes identifying an item for which an item location is to be determined. If, for example, updating an item location database (method 250) is performed periodically by server 110*a*, identifying an item may include identifying an item having one or more corresponding entries in item location database 112 and/or submission database 113. If, for example, updating an item location database (method 250) is performed in response to receipt of an item submission 120, identifying an item may include identifying the item corresponding to the item submission 120.

In some embodiments, determining an item location (block 254) includes determining an item location 132 (e.g., one or more geographic locations) for the identified item based at least in part on the location data 124 (and/or other data) of one or more item submissions 120 corresponding to the item. In some embodiments, location data 124 (and/or other data) used to determine an item location 132 for an item may include the location data 124 (and other data) of entries of submission database 113 associated with the item (e.g., having an item identifier corresponding to the item). Continuing with the above described embodiment relating to the item "XYZ cereal," the location "aisle three of ABC Supermarket," and the item submission 120 including the geotagged image of the XYZ cereal box acquired by the user 142*a* while shopping on aisle three of ABC Supermarket 102*a*, for example, determining an item location may include the location server 110*a* determining an item location 132 of "aisle three of ABC Supermarket" based on the geotag (e.g., the location data 124) of the corresponding item submission 120.

In some embodiments, more than one item location 132 may be associated with an item. For example, XYZ cereal may be located on both of aisles one and three of ABC Supermarket 102*a*, item submissions 120 may be received that correspond to both of "aisle one of ABC Supermarket" and "aisle one and three of ABC Supermarket," and the item location 132 may include location data 124 corresponding to both of aisles one and three of ABC Supermarket 102*a*. Thus, for example, a user inquiring about the location of XYZ cereal may be provided with information about both locations.

In some embodiments, an item location 132 is updated based at least in part on the received location data 124. In some embodiments, an item location 132 is updated to reflect the most recent location information. For example, an existing item location 132 may be replaced with a location corresponding to the most recent location request 140. If, for example, a first item submission 120 indicates that XYZ cereal is located on aisle one of ABC Supermarket 102*a*, and a second/subsequently received item submission 120 indicates that XYZ cereal is located on aisle three of ABC Supermarket 102*a*, the item location 132 of the database entry 126 for XYZ cereal may be determined to be "aisle one of ABC Supermarket," after receipt of the first item submission 120, and subsequently determined to be "aisle three of ABC Supermarket," after receipt of the second item submission 120.

In some embodiments, an item location 132 is determined to be a location corresponding to multiple item submissions 120. If, for example, a first item submission 120 indicates that XYZ cereal is located on aisle one of ABC Supermarket 102*a*, and a second/subsequently received item submission 120 indicates that XYZ cereal is located on aisle three of ABC Supermarket 102*a*, the item location 132 may be determined to be "aisle one of ABC Supermarket," after receipt of the first item submission 120, and subsequently determined to be "aisle one of ABC Supermarket" and/or "aisle three of ABC Supermarket" after receipt of the second item submission 120. Thus, in response to a query for a location of XYZ cereal, a user 142 may be informed that XYZ cereal is located in one or both of two places (e.g., aisle one and/or aisle three of ABC Supermarket 102*a*).

In some embodiments, an item location 132 is determined based on receipt of at least a threshold number of similar item locations. For example, an item location 132 may be changed when a threshold number of item submissions indicating a different location are received. If, for example, a first set of item submissions 120 indicate that XYZ cereal is located on aisle one of ABC Supermarket 102a, a threshold of at least five similar submissions 120 is required to change an item location 132 for an item, and a single item submission 120 is received indicating that XYZ cereal is located on aisle three of ABC Supermarket 102a, then the item location 132 of the database entry 126 for XYZ cereal of the item location database 112a may be determined to be "aisle one of ABC Supermarket" based on the first set of item submissions 120, but may not be subsequently determined to be "aisle three of ABC Supermarket," because the threshold number of submissions 120 indicating the new location (e.g., five submissions 120) have not yet been received. If an additional four submissions 120 are received) that indicate that XYZ cereal is located on aisle three of ABC Supermarket 102a, for example, the item location 132 for XYZ cereal may be determined to be or include "aisle three of ABC Supermarket," because the threshold number of submissions 120 indicating the new location (e.g., five submissions 120) has been received.

In some embodiments, an item location 132 may include multiple item locations ranked and/or prioritized based on a number of corresponding item submissions 120 received. If, for example, a first set of ten item submissions 120 indicates that XYZ cereal is located on aisle one of ABC Supermarket 102a, a second set of five item submissions 120 indicates that XYZ cereal is located on aisle three of ABC Supermarket 102a, a third set of two item submissions 120 indicates that XYZ cereal is located on aisle ten of ABC Supermarket 102a, and a threshold of at least five similar item submissions 120 is required to change an item location 132 for an item, the item location 132 for the XYZ cereal database entry 126 of the item location database 112a may be determined to include a primary item location of "aisle one of ABC Supermarket" based on the first set of item submissions 120 having the highest number of submissions, and a secondary location of "aisle three of ABC Supermarket" based on the second set of item submissions 120 having the second highest number of submissions. The location of aisle ten of ABC Supermarket may not yet be included in the item location 132 based on the threshold number of item submissions 120 having not been met yet. Thus, in response to a query for a location of XYZ cereal, a user may be informed that XYZ cereal is most likely located at aisle one of ABC Supermarket 102a, but may also be found at aisle three of ABC Supermarket 102a.

In some embodiments, an item location 132 is determined based on item submissions 120 submitted within a sliding window of time. If, for example, ten item submissions 120 for XYZ cereal were submitted more than one week ago, five item submissions 120 for XYZ cereal were submitted within the last week, and a relevant window is one week (e.g., the last seven days), the current item location 132 for XYZ cereal may be determined using the five item submissions 120 for XYZ cereal submitted within the last week, and not using ten item submissions 120 for XYZ cereal that were submitted more than one week ago.

In some embodiments, an item location 132 may be removed if corresponding item submissions 120 have not been received for a threshold period of time. If, for example, a set of ten item submissions 120 indicate that XYZ cereal is located on aisle one of ABC Supermarket 102a, but no submissions 120 for XYZ cereal have been received in the last week, and a threshold period of time for receiving is one week (seven days), the item location 132 of the database entry 126 for XYZ cereal may be updated to reflect no known location. Such an embodiment may help to ensure that location information is fresh and has not become outdated.

In some embodiments, an item location 132 is determined based on the temporal proximity of item submissions 120. If, for example, a first item submission 120 for XYZ cereal was submitted four days ago, a second item submission 120 for XYZ cereal was submitted two days ago, and a third item submission 120 for XYZ cereal was submitted one day ago, the current item location 132 for XYZ cereal may be determined using the three item submissions 120, including weighting the contribution of the first (oldest) item submission 120 the least, weighting the contribution of the second item submission 120 moderately, and weighting the contribution of the third (newest) item submission 120 the most. Thus, if the first, second, and third item submissions 120 indicated that XYZ cereal was located on aisles one, one, and three of ABC Supermarket 102a, respectively, and have weightings/scores inversely proportional to their age in days (e.g., scores of 0.25, 0.5 and 1, respectively), aisle three of ABC Supermarket 102a may be determined to have a total score of 1, aisle one of ABC Supermarket 102a may be determined to have a total score of 0.75 (e.g., 0.25+0.5=0.75), and the item location 132 for XYZ cereal may be determined to be aisle three of ABC Supermarket 102a based on the location of aisle one having the highest score.

In some embodiments, updating the database entry for the item (block 256) includes updating the location 132 of an entry 126 of a database 112 that corresponds to the item. Continuing with the above described embodiment relating to the item "XYZ cereal" and the location "aisle three of ABC Supermarket," for example, if the item location 132 of the database entry 126 for XYZ cereal (e.g., having the item identifier 128 of "xyz_cereal" previously included in the item location "aisle one of ABC Supermarket," and a new location of aisle three of ABC Supermarket 102a is determined based the location data 124 of the latest item submission 120 from user device 108a, updating the database entry for the item may include server 110a updating the item location 132 of the database entry 126 of the database 112a corresponding to XYZ cereal to include "aisle three of ABC Supermarket".

Figure 3:
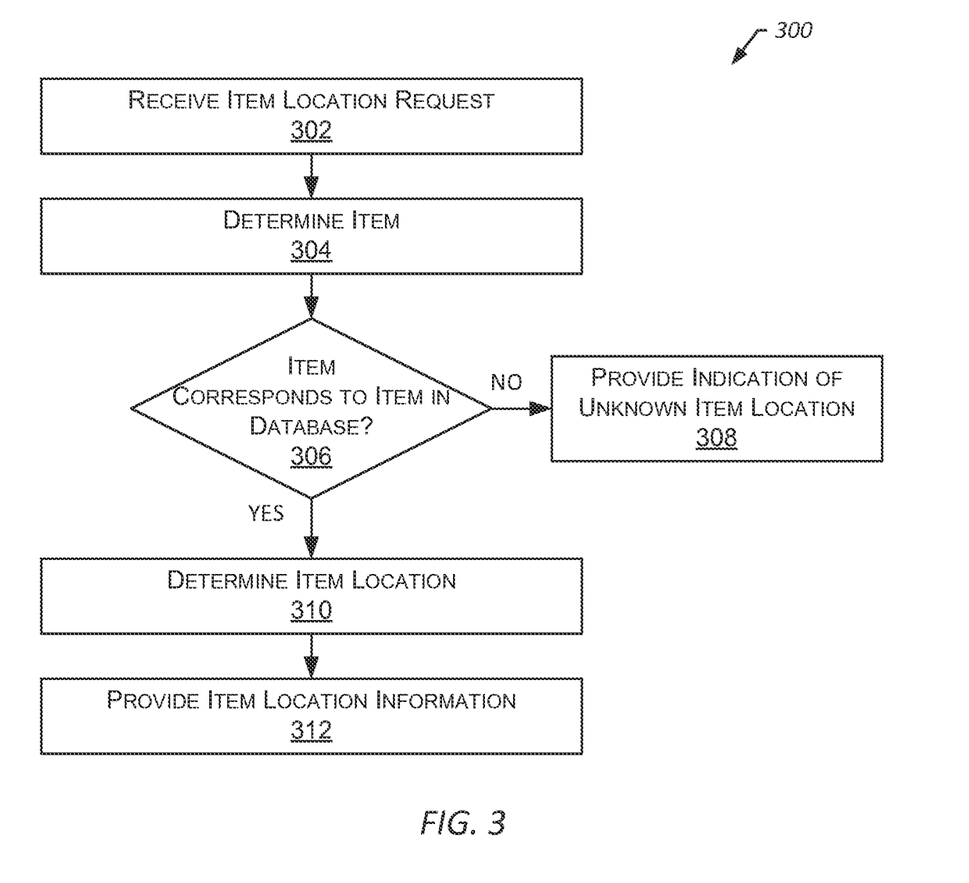
FIG. 3 is a flowchart that illustrates a method of providing item location information in accordance with one or more embodiments.

FIG. 3 is a flowchart that illustrates a method 300 of providing item location information in accordance with one or more embodiments. Method 300 may generally include receiving an item location request (or query) (block 302), determining an item corresponding to the item location (block 304), determining whether the item corresponds to an entry in an item location database (block 306), in response to determining that the item corresponds to an entry in the item location database, determining an item location (block 310), and providing item location information (block 312). Method 300 may also include, in response to determining that the item does not correspond to an entry in the item location database, providing an indication that item location is unknown (block 308). Method 300 may be performed, for example, by one or more location servers 110.

In some embodiments, receiving an item location request (block 302) includes receiving a request for information regarding the location of one or more items. For example, if the user 142c is interested in purchasing XYZ cereal, the user 142c may submit a query for the location of XYZ cereal using the item location application of his or her mobile user device 108c, and the application may cause the mobile user device 108c to transmit a corresponding item location request 140 to the location server 110a.

In some embodiments, an item location request 140 may include a request for location information about a single item or multiple items. For example, a user can submit a list (e.g., a shopping or a wish list) that identifies one or more items of interest. If, for example, a user is only interested in locating XYZ cereal, the user may submit a list including only XYZ cereal, and the corresponding item location request 140 may include a request for information about XYZ cereal. If, for example, a user is interested in locating several items, such as XYZ cereal, AAA ice cream, and so forth, the user may submit a list including XYZ cereal, AAA ice cream, and so forth (e.g., a shopping list for multiple items), and the corresponding item location request 140 may include a request for information about XYZ cereal, AAA ice cream, and so forth.

In some embodiments, determining an item corresponding to the item location request (block 304) includes determining an item based on the item identification data of the item location request 140. Continuing with the above described embodiment of a shopping list including only XYZ cereal, determining an item corresponding to the item location request may include determining a single item, "XYZ cereal." Continuing with the above described embodiment of a shopping list including multiple items such as XYZ cereal, AAA ice cream, and so forth, determining an item corresponding to the item location request may include determining multiple items, including "XYZ cereal," "AAA ice cream," and so forth.

In some embodiments, determining whether the item corresponds to an entry in an item location database (block 306) includes determining whether the item corresponds to an existing database entry 126 of an item location database 112. Continuing with the above described embodiment relating to the single item list with XYZ cereal, for example, determining whether the item corresponds to an entry in an item location database may include the location server 110a determining whether the determined product "XYZ cereal" matches one or more item identifiers 128 of one or more database entries 126 of the database 112a. In some embodiments, a match may be based on a normalized version of the determined product. For example, the item name "XYZ cereal" may be normalized in the same manner as the item identifiers 128 of the data entries 126 (e.g., by making each letter lowercase and replacing spaces with underscores such that "XYZ cereal" is normalized to "xyz_cereal") to facilitate the matching process. Thus, it may be determined that the item "XYZ cereal" corresponds to a database entry 126 of the database 112a if, for example, a database entry 126 of the database 112a has an item identifier of "xyz_cereal." It may be determined that the item "XYZ cereal" does not correspond to a database entry 126 of the database 112a if, for example, the database 112a does not include a database entry 126 having an item identifier 128 of "xyz_cereal." Continuing with the above described embodiment relating to the multi-item list with XYZ cereal, AAA ice cream, and so forth, for example, determining whether the item corresponds to an entry in an item location database may include the location server 110a determining whether any of the determined products, "XYZ cereal," "AAA ice cream" and so forth, matches one or more item identifiers 128 of one or more data entries 126 of the database 112a.

In some embodiments, determining a location for the item (e.g., in response to determining that the item corresponds to an entry in the item location database) (block 310) includes determining, for each of the one or more items having a corresponding database entry 126 of an item location database 112, a geographic location for the item. Continuing with the above example relating to XYZ cereal, if a database entry 126 corresponding to XYZ cereal (e.g., a database entry 126 having an item identifier "xyz_ceral") includes an item location 132 of "aisle three of ABC Supermarket" (e.g., determined at block 260), the location for XYZ cereal may be determined to be aisle three of ABC Supermarket 102a based on the item location 132. In some embodiments, a location is determined in response to an item location request 140. For example, the location server 110a may determine the item location 132 of "aisle three of ABC Supermarket" in response to receiving the item location request 140 including a request for the location of "XYZ cereal." Thus, for example, the item location 132 for the item may be determined in response to receiving an item location request 140 corresponding to the item. Such an embodiment may help to reduce processing overhead because the item location 132 may only need to be determined if and when an item location request 140 for the item is received.

In some embodiments, providing item location information (block 312) includes providing information regarding the location of one or more items for presentation to a user 142 via a user device 108. The location information may include, for example, an interactive map and/or navigation instructions (e.g., on-screen navigational queues such as arrows, audible queues such as voice prompts or beeping, written instructions such as turn-by-turn directions, and/or the like) to direct a user to the item location. Continuing with the above described embodiment relating to the single item list with XYZ cereal, for example, the location server 110a may serve to user device 108c network content including an interactive map and/or navigation instructions to direct the user 142c to aisle three of ABC Supermarket 102a. The user device 108c may render the content for display to the user 142c. The interactive map and/or the navigation instructions may include, for example, text stating that "XYZ cereal is located at aisle three of ABC Supermarket," a geographic map having one or more markers indicative of the geographic location of ABC Supermarket 102a, arrows (or other on-screen navigational queues) that dynamically change to guide the user 142c to aisle three of ABC Supermarket 102a, voice prompts (or other audible queues) that interactively guide the user 142c to aisle three of ABC Supermarket 102a, written turn-by-turn directions that guide the user 142c to aisle three of ABC Supermarket 102a, and so forth.

In some embodiments, the content may include location information 144 for a plurality of items. Continuing with the above described embodiment relating to the multi-item list with XYZ cereal, AAA ice cream, and so forth, for example, the location information may include an interactive map and/or navigation instructions to direct the user 142c to a determined location for XYZ cereal (e.g., aisle three of ABC Supermarket 102a) and to a determined location for AAA ice cream (e.g., aisle ten of DEF Grocery).

In some embodiments, the content may include location information 144 that provides an efficient sequence and routing for navigating to the plurality of items. If three items are determined to be located at ABC Supermarket 102a, one item is determined to be located at DEF Grocery, and two items are determined to be located at Mike's Electronics Store, for example, the content may include an interactive map and/or navigation instructions to direct the user 142c to first visit ABC Supermarket 102a (to purchase the three items located there), then to visit Mike's Electronics Store 102b (to purchase the two items located there), and finally to visit DEF Grocery (to purchase the item located there).

In some embodiments, the content may include location information 144 that provides directions for navigating to an item within a physical entity location 102. For example, if XYZ cereal is determined to be located on aisle three of ABC Supermarket 102a and AAA ice cream is determined to be located on aisle one of ABC Supermarket 102a, the content may include an interactive map and/or navigation instructions to direct the user 142c to first visit aisle one of ABC Supermarket 102a to find AAA ice cream and then to visit aisle three of ABC Supermarket 102a to find XYZ cereal.

In some embodiments, a user is prompted to provide an item submission that confirms whether the item is actually located at the indicated location. For example, if the user 142c is directed to aisle three of ABC Supermarket 102a to find XYZ cereal, upon determining that the user 142c has arrived at the target location (e.g., aisle three of ABC Supermarket 102a), the application on the mobile phone may present the inquiry "Is XYZ cereal located at aisle three of ABC Supermarket?" and prompt the user 142c to select "yes" if XYZ cereal is located there, or select "no" if XYZ cereal is not located there. Thus, users 142 may be encouraged to continue the cycle of crowdsourcing information.

In some embodiments, providing an indication that an item location is unknown (e.g., in response to determining that the item does not correspond to an entry in the item location database) (block 308) includes providing information indicating that the locations for one or more of the items of the item location request 140 are unknown for presentation to a user. Continuing with the above described embodiment relating to the item list with AAA ice cream, for example, if the location server 110a is unable to locate a database entry 126 of the database 112a that corresponds to AAA ice cream, the location server 110a may serve to the user device 108c network content including a statement that the item "AAA ice cream cannot be located . . . please try correcting and resubmitting your item search or submit a search for another item." In some embodiments, such a message may be accompanied by an identification of a similar/alternative item and corresponding locations. For example, the content may include the statement that "AAA ice cream cannot be located, but we found BBB ice cream located at aisle three of ABC Supermarket—select navigate to get directions to it."

Although embodiments are described in the context of retail stores, similar embodiments may be employed in a variety of contexts. For example, similar techniques may be employed to maintain databases of item locations at various physical locations, including business, offices, mobile office locations (e.g., booths at tradeshows), private homes, and/or the like. For example, item submissions 120 can be submitted to maintain locations of personal items in the home, such as the locations of keys, wallets, television remotes, and/or the like.

It will be appreciated that the methods 200, 250, and 300 are exemplary embodiments of methods that may be employed in accordance with the techniques described herein. The methods 200, 250, and 300 may be modified to facilitate variations of their implementations and uses. The order of the methods 200, 250, and 300 and the operations provided therein may be changed, and various elements may be added, reordered, combined, omitted, modified, etc. Portions of the methods 200, 250, and 300 may be implemented in software, hardware, or a combination thereof. Some or all of the portions of the methods 200, 250, and 300 may be implemented by one or more of the modules/applications described herein.

Figure 4:
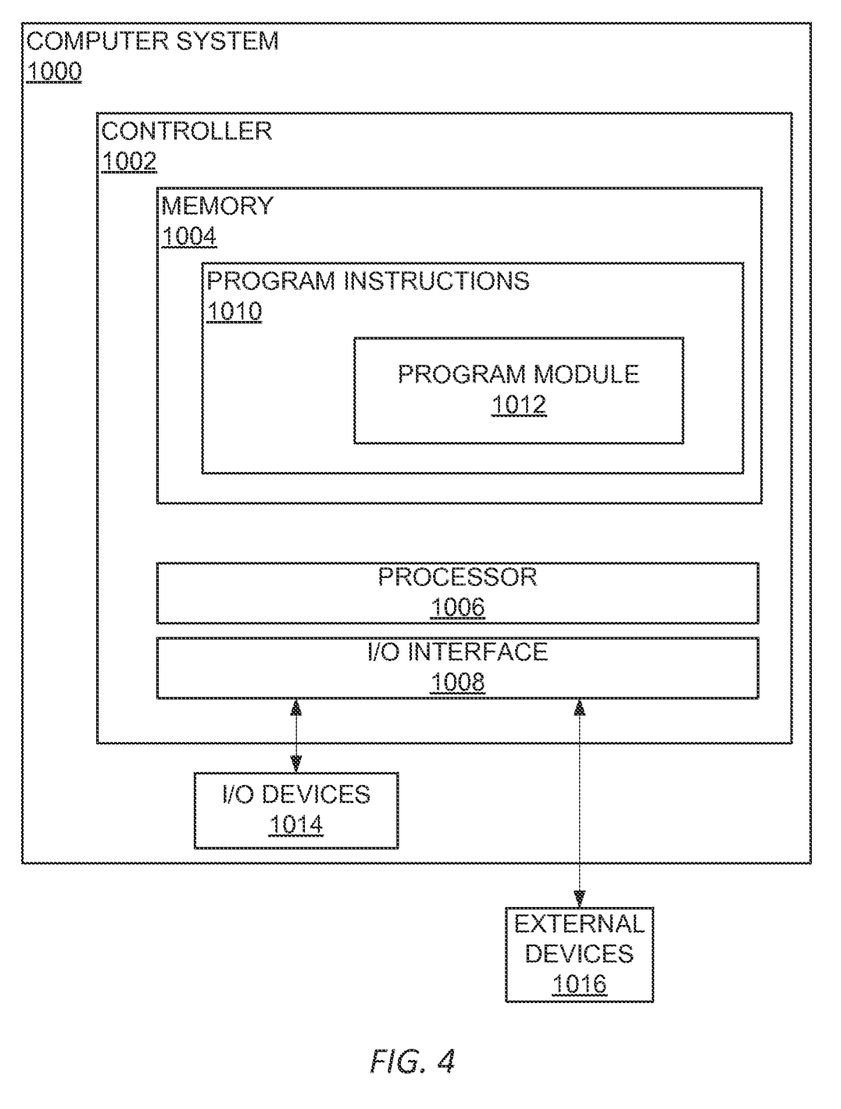
FIG. 4 is a diagram that illustrates an exemplary computer system in accordance with one or more embodiments.

FIG. 4 is a diagram that illustrates an exemplary computer system 1000 in accordance with one or more embodiments.

In some embodiments, the computer system 1000 includes a controller 1002 for controlling the operational aspects of the computer system 1000. In some embodiments, the controller 1002 includes a memory 1004, a processor 1006, and an input/output (I/O) interface 1008. The memory 1004 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), and/or the like. The memory 1004 may include a non-transitory computer-readable storage medium having program instructions 1010 stored thereon that are executable by a computer processor (e.g., the processor 1006) to cause the functional operations (e.g., methods/routines/processes) described herein. The program instructions 1010 may include program module(s) 1012 (e.g., including program instructions) that are executable by the processor 1006 to provide some or all of the functionality described herein, including that described with regard to the user devices 108, the location servers 110, and the methods 200, 250, and 300. The program instructions 1010 may include, for example, program module(s) 1012 such as an item submission module (e.g., for performing some or all of the operational aspects of the method 200 described herein with regard to at least FIG. 2A), an item location module (e.g., for performing some or all of the operational aspects of the method 250 described herein with regard to FIG. 2C) and/or an application module (e.g., for performing some or all of the operational aspects of the method 300 described herein with regard to at least FIG. 3).

The processor 1006 may be any suitable processor capable of executing or performing program instructions. The processor 1006 may include a central processing unit (CPU) that carries out program instructions (e.g., program instructions of the program module(s) 1012) to perform arithmetical, logical, and input/output operations described herein, including those described with regard to the user devices 108 and the location servers 110. The processor 1006 may include one or more processors.

The I/O interface 1008 may provide an interface for communication with one or more I/O devices 1014, such as a mouse/keyboard/touchscreen, a graphical user interface (GUI) (e.g., a display), and/or the like. A display may include a suitable electronic display that can display item submission forms, item location information, and/or the like. Devices may be connected to the I/O interface 1008 via a wired or wireless connection. The I/O interface 1008 may provide an interface for communication with one or more external devices 1016, such as various components and entities of the item location system 104, including the network 107.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A system comprising:
  a retail store database comprising a plurality of product entries corresponding to products carried by a physical location of a retail store; and
  a product location computer comprising:
    one or more processors; and
    one or more memory devices storing computer-executable instructions executable by the one or more processors to cause:
      receiving, from a first mobile user device, a first product submission comprising:
        a first product identifier indicative of a first product,
        a first time associated with the first product submission, the first time within a first period of time, and
        first product location data indicative of a first location of the first product within the physical location of the retail store;
      determining, based at least in part on the first product submission that falls within the first period of time, the first product is at the first location;
      receiving, from a second mobile user device, a second product submission comprising:
        a second product identifier indicative of the first product,
        a second time associated with the second product submission, the second time within a second period of time, wherein the first period of time is outside of the second period of time, and
        second product location data indicative of a second location of the first product within the physical location of the retail store;
      receiving, from a third mobile user device, a third product submission comprising:
        a third product identifier indicative of the first product,
        a third time associated with the third product submission, the third time within the second period of time, and
        third product location data indicative of the second location;
      determining, based on at least the second product submission and the third production submission, the first product is at the second location; and
      storing the second location for the first product in the retail store database, wherein the second location for the first product is stored in association with the second product identifier.

2. The system of claim 1, the computer-executable instructions executable by the one or more processors to further cause:
  receiving, from a fourth mobile user device, a location request for the first product;
  obtaining, from the retail store database, the second location; and
  transmitting, to the fourth mobile user device, the second location.

3. The system of claim 1, wherein the first product submission is submitted via a crowd-source application, wherein the crowd-source application enables a plurality of mobile user devices to submit information regarding respective locations of products within retail stores.

4. The system of claim 1, wherein the first product submission further comprises an image of a user's surroundings that is automatically acquired and submitted by the first mobile user device.

5. A method comprising:
  receiving, by at least one processor coupled to at least one memory and from a plurality of mobile user devices, a first plurality of item submissions, a first item submission of the first plurality of item submissions comprising:
    first item identifier data indicative of a first item;
    a first time associated with the first item submission, the first time within a first period of time; and
    first item location data indicative of a first location of the first item;
  determining that the first item is at the first location;
  receiving, by the at least one processor, a second plurality of item submissions including a second item submission and a third item submission, the second item submission comprising:
    second item identifier data indicative of the first item,
    a second time associated with the second item submission, the second time within a second period of time, wherein the first period of time is outside of the second period of time, and
    second item location data indicative of a second location,
  and the third item submission comprising:
    third item identifier data indicative of the first item,
    a third time associated with the third item submission, the third time within the second period of time, and
    third item location data indicative of the second location;
  determining, using at least a portion of the second plurality of item submissions that fall within the second period of time, the portion of the second plurality of item submissions including the second item submission and the third item submission, the first item is at the second location; and storing the second location for the first item in an item location database, wherein the second location for the first item is stored in association with the second item identifier data.

6. The method of claim 5, further comprising:
receiving, from a mobile user device, a location request for the first item;
obtaining, from the item location database, the second item location data for the first item; and
transmitting, to the mobile user device, data indicative of the second location.

7. The method of claim 6, wherein transmitting the data indicative of the second location comprises serving navigational information configured to direct the mobile user device to the second location.

8. The method of claim 5, wherein the second item identifier data is extracted from a photographic image acquired via a mobile user device, and wherein the second item location data further comprises geolocation data associated with the photographic image.

9. The method of claim 5, wherein at least one of the first plurality of item submissions comprises an image of surroundings of a mobile user device, the image automatically acquired and submitted via the mobile user device.

10. The method of claim 5, wherein an item submission of the first plurality of item submissions comprises a radio-frequency identification (RFID) tag identifier of the first item proximate a mobile user device and corresponding locations that are acquired and submitted via the mobile user device as the mobile user device moves through a physical location of a retail business.

11. The method of claim 5, the first item submission, the second item submission, or the third item submission is manually submitted by a user via a mobile user device.

12. The method of claim 5, further comprising:
determining that respective item identifier data of the first plurality of item submissions corresponds to the first item.

13. A system, comprising:
at least one memory storing computer-executable instructions; and
at least one processor configured to access the at least one memory and to execute the computer-executable instructions to:
receive, from a plurality of mobile user devices, a first plurality of item submissions, a first item submission of the first plurality of item submissions comprising:
first item identifier data indicative of a first item;
a first time associated with the first item submission, the first time within a first period of time; and
first item location data indicative of a first location of the first item;
determine that the first item is at the first location;
receive a second plurality of item submissions including a second item submission and a third item submission, the second item submission comprising:
second item identifier data indicative of the first item,
a second time associated with the second item submission, the second time within a second period of time, wherein the first period of time is outside of the second period of time, and
second item location data indicative of a second location,
and the third item submission comprising:
third item identifier data indicative of the first item,
a third time associated with the third item submission, the third time within the second period of time, and
third item location data indicative of the second location;
determine, using at least a portion of the second plurality of item submissions that fall within the second period of time, the portion of the second plurality of item submissions including the second item submission and the third item submission, the first item is at the second location; and
store the second location for the first item in an item location database, wherein the second location for the first item is stored in association with the second item identifier data.

14. The system of claim 13, wherein the at least one processor is further configured to access the at least one memory and to execute the computer-executable instructions to:
receive, from a mobile user device, a location request for the first item;
obtain, from the item location database, the second item location data for the first item; and
transmit, to the mobile user device, data indicative of the second location.

15. The system of claim 13, wherein the second item identifier data is extracted from a photographic image acquired via a mobile user device, and wherein the second item location data further comprises geolocation data associated with the photographic image.

16. The system of claim 13, wherein at least one of the first plurality of item submissions comprises an image of surroundings of a mobile user device, the image automatically acquired and submitted via the mobile user device.

17. The system of claim 13, wherein the first item submission, the second item submission, or the third item submission is manually submitted by a user via a mobile user device.

18. The system of claim 13, wherein at least one of the plurality of mobile user devices comprises a mobile camera device.

19. The system of claim 13, wherein the first item comprises a product offered for sale at a physical location of a retail business.

20. The system of claim 13, wherein the first item comprises a portable personal item.

* * * * *